(No Model.)
R. D. SEYMOUR.
HOIST FOR EXCAVATORS.
No. 550,331.   Patented Nov. 26, 1895.
4 Sheets—Sheet 1.
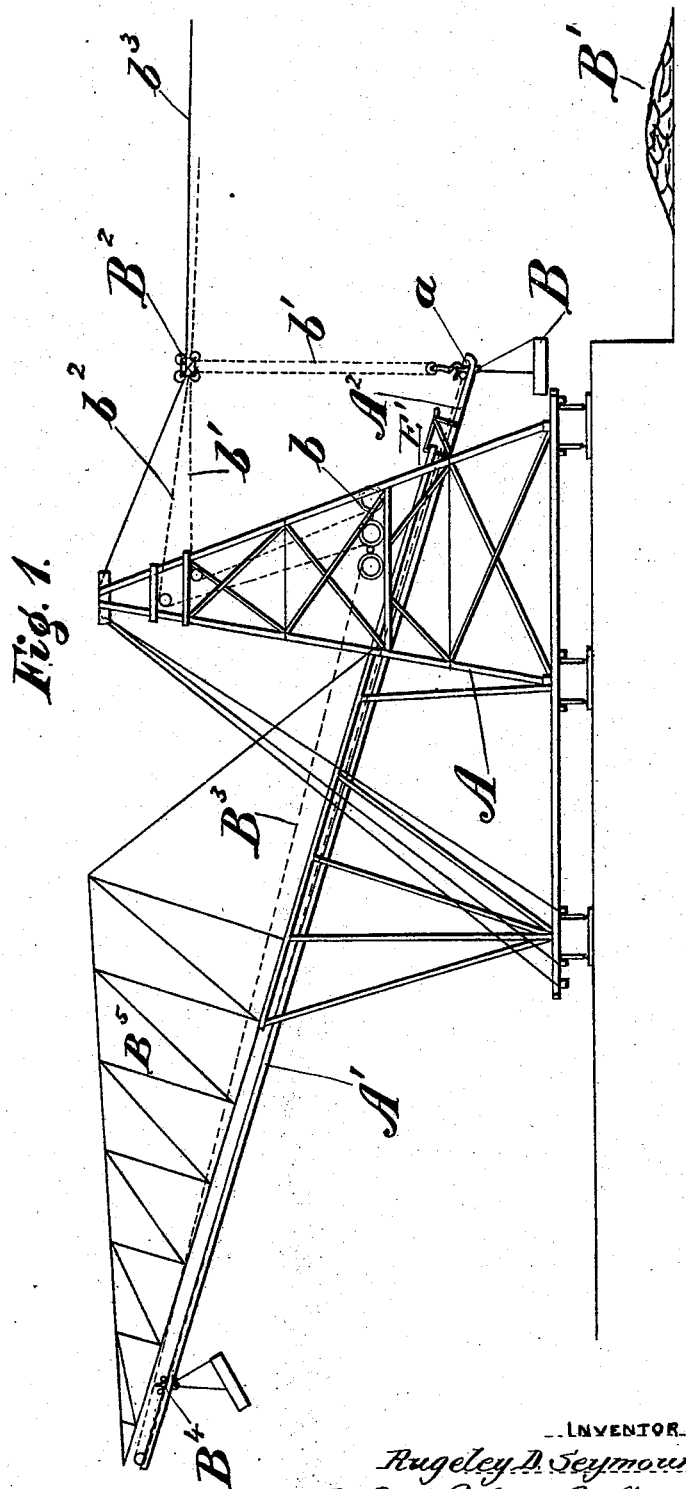
WITNESSES
Thomas B. McGregor.
Annie C. Courtenay.
INVENTOR
Rugeley D. Seymour.
By Banning & Banning & Sheridan
ATTORNEYS.

(No Model.) 4 Sheets—Sheet 2.
R. D. SEYMOUR.
HOIST FOR EXCAVATORS.
No. 550,331. Patented Nov. 26, 1895.
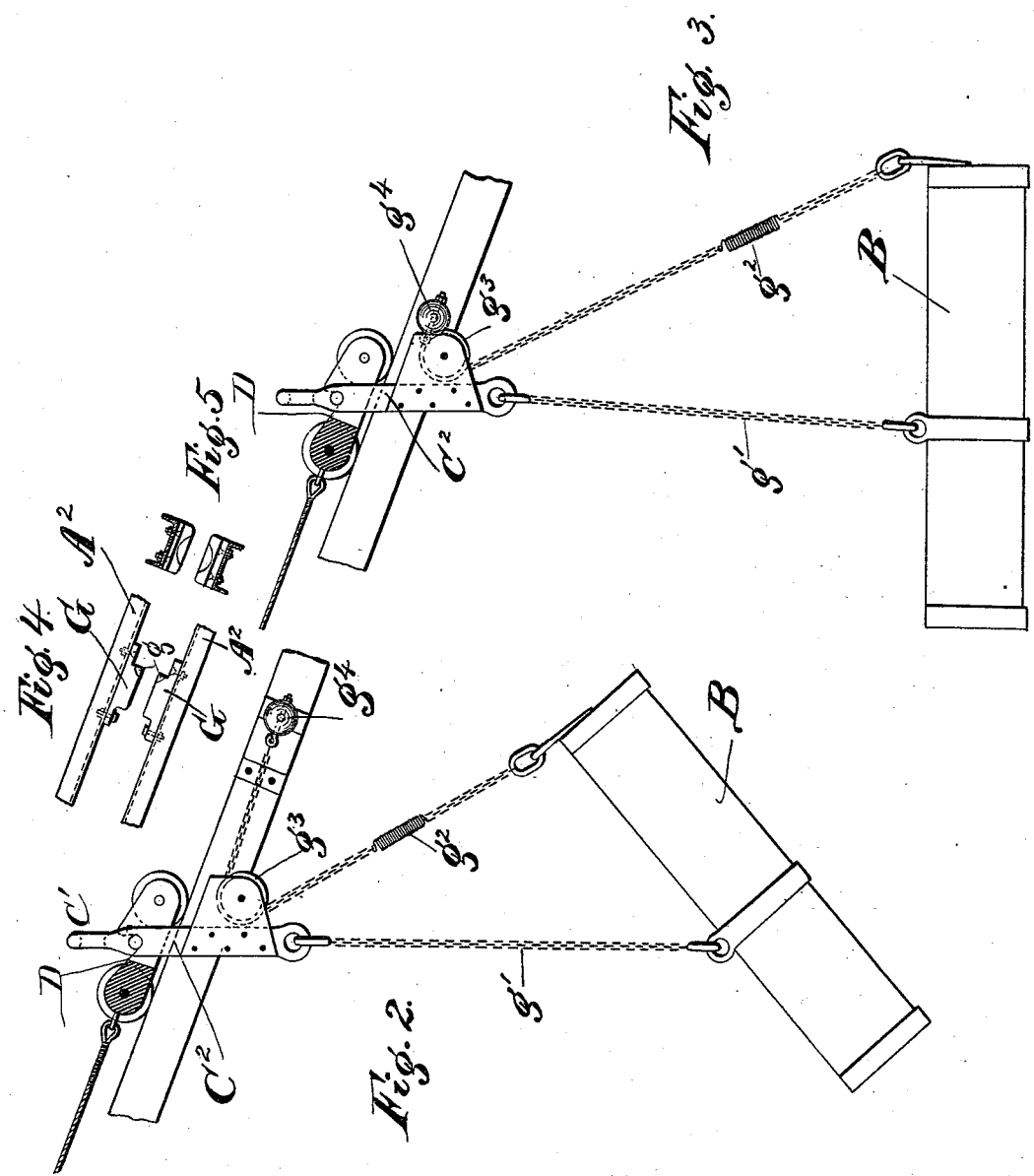

(No Model.) 4 Sheets—Sheet 3.
R. D. SEYMOUR.
HOIST FOR EXCAVATORS.
No. 550,331. Patented Nov. 26, 1895.
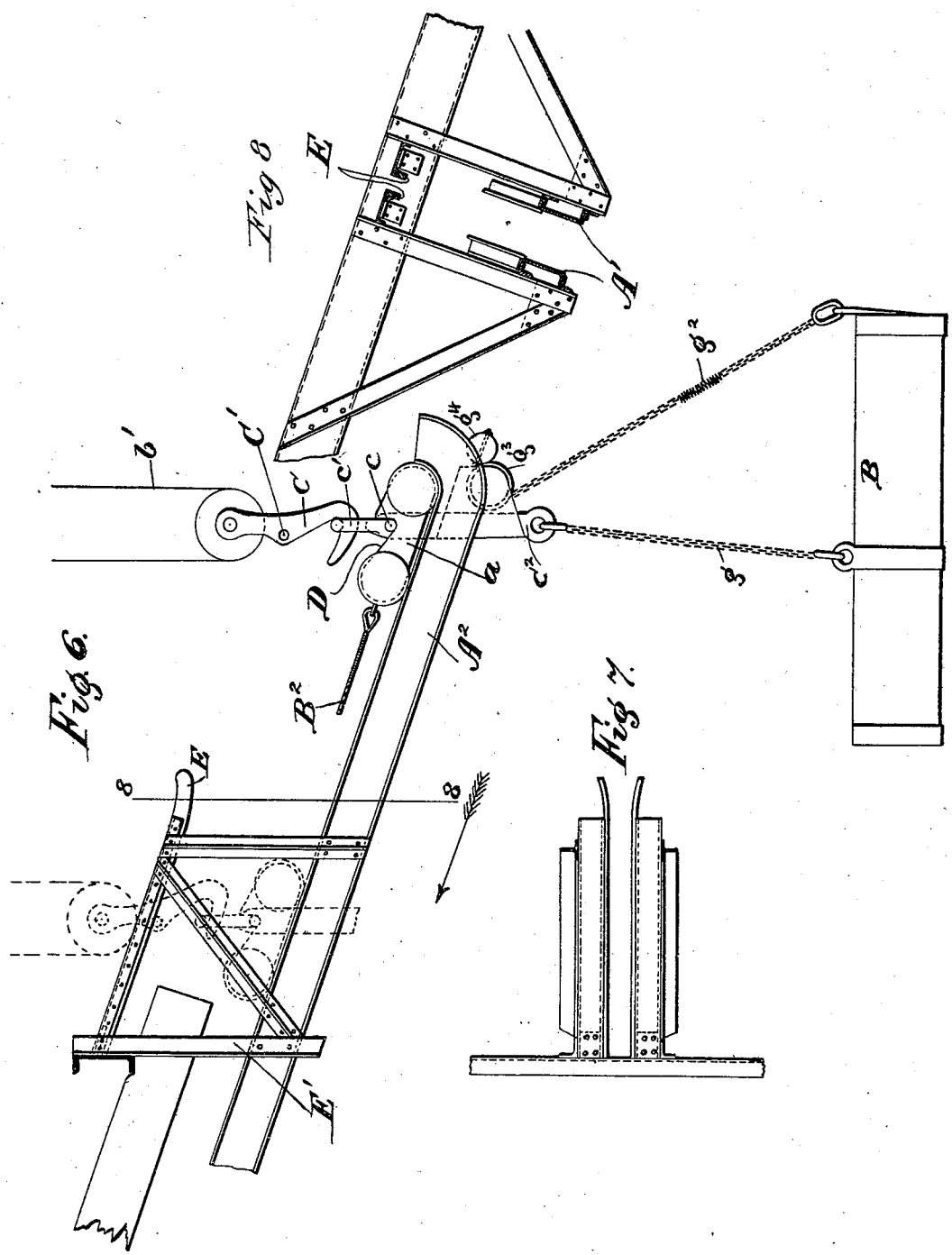
WITNESSES
Thomas B. McGregor
Annie C. Courtenay
INVENTOR
Rugeley D. Seymour
BY Banning & Banning & Sheridan.
ATTORNEYS (No Model.)  4 Sheets—Sheet 4.
R. D. SEYMOUR.
HOIST FOR EXCAVATORS.
No. 550,331.  Patented Nov. 26, 1895.
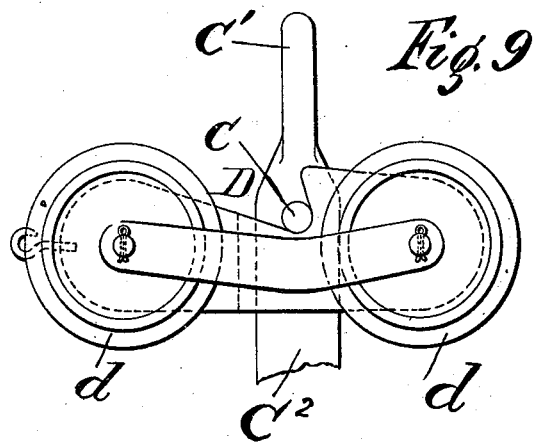
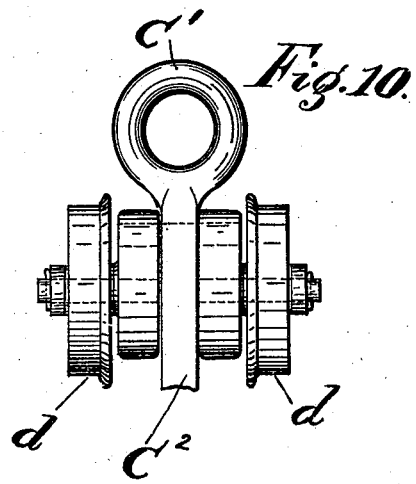
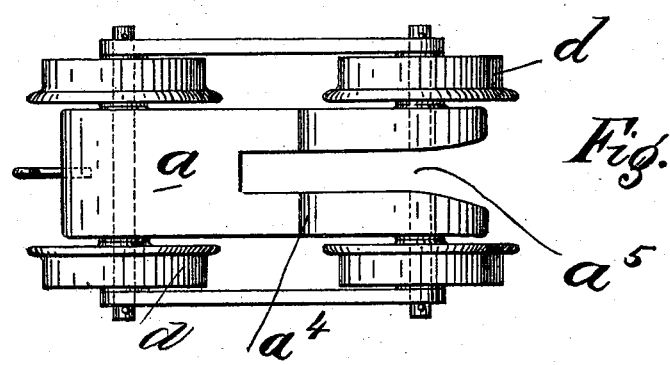
WITNESSES
Thomas B. McGregor
Annie C. Courtenay
INVENTOR
Rugeley D. Seymour
BY Banning & Banning & Sheridan
ATTORNEYS

UNITED STATES PATENT OFFICE.

RUGELEY D. SEYMOUR, OF CHICAGO, ILLINOIS, ASSIGNOR TO HOWARD N. ELMER, OF SAME PLACE.

HOIST FOR EXCAVATORS.

SPECIFICATION forming part of Letters Patent No. 550,331, dated November 26, 1895.

Application filed January 17, 1895. Serial No. 535,287. (No model.)

*To all whom it may concern:*

Be it known that I, RUGELEY D. SEYMOUR, a citizen of the United States, residing at Chicago, Cook county, Illinois, have invented certain new and useful Improvements in Hoists for Excavators, of which the following is a specification.

The object of my invention is to provide a simple, economical, and efficient hoist and conveyer for use in excavating and similar purposes; and the invention consists in the features and combinations hereinafter described and claimed.

In the accompanying drawings, Figure 1 is a side elevation of my entire plant in diagrammatic form, shown in connection with an excavation; Fig. 2, a side elevation of the skip in its dumping position; Fig. 3, a side elevation of the skip in its normal position; Figs. 4 and 5, details of the mechanism used for dumping the skip; Fig. 6, an enlarged view of the automatic releasing mechanism and a portion of the cantilever, trolley, &c., showing the skip and fall-block hook in their engaged and releasing positions; Fig. 7, a plan view of a portion of the automatic releasing mechanism shown in Fig. 6, looking at it from the top; Fig. 8, a transverse section, taken on line 8 of Fig. 6, looking in the direction of the arrow; Fig. 9, a side elevation of the trolley; Fig. 10, an end elevation of the same; and Fig. 11, a plan view of the trolley, looking at it from the top.

My invention relates especially to cableway-hoists used in connection with an inclined plane upon which trolleys carrying loaded skips move up and down supported by a cantilever, and particularly to the means for depositing the loaded skip onto a trolley, hauling it up the inclined plane, dumping it, bringing the unloaded skip and trolley back into position to be engaged by the hoist, and the means for engaging and automatically releasing the skip with the hoist.

In constructing my improvement I use a combined movable cableway $A'$ and cantilever $B^5$, from which inclined tracks $A^2$ are suspended or attached, of any desired size, shape, and form of construction. Upon above suspended inclined tracks $A$ a trolley car $a$ may run back and forth.

Describing the diagrammatic elevation (see Fig. 1) and the operation of my improvement, A is the supporting-tower for the cableway, $A'$ the inclined plane supported by the cantilever, as shown, and $A^2$ the tracks of the inclined plane upon which the trolleys run back and forth. The skip B is loaded in the excavation $B'$ and hoisted by means of a hoisting-engine $b$, which may be located at any desired position on the tower by the cable $b'$. The engine is also provided with an endless cable $b^3$, which actuates or governs the action of a cableway-carriage $B^2$ on the cable $b^2$, that runs from the top of the tower to a movable tail tower at some convenient point. The skip, as stated, is loaded and raised to the desired position to deposit on a weighted trolley $a$ at the lower end of the inclined plane. The fall-block hook is then released by means hereinafter described, and the engine started to raise the trolley by a cable $B^3$ until it reaches a point on the inclined plane at about the position shown at $B^4$, when, by the means hereinafter described, the skip is dumped onto a spoil or waste bank. The engineer then releases his cable and the weight of the trolley and skip carries it down to be engaged by the hoist mechanism, as hereinafter described, when the skip is disengaged from the trolley and carried into the excavation to be reloaded.

Describing the means by which the skip and its carrier are engaged and disengaged from the fall-block of the hoisting mechanism and their engagement with the trolley, (see Figs. 6, 7, and 8,) the hoisting-cable $b'$ is provided with a fall-block and hook C, which latter is adapted to engage a skip and raise or lower the same. When the skip is loaded, it is raised into the position shown at the rear end of the inclined plane in Fig. 6, and its carrier $C^2$ is brought in between the rails $A^2$ of the inclined plane to engage the trolley car $a$, which is bifurcated at its rear end, as shown in Fig. 11. The carrier is then lowered until its cross-pin $c$ engages with an upper hooked recess D of the trolley. The motor being started operates the cable $B^2$ to draw the trolley and hoisting mechanism up the inclined plane until the pin $C'$ on the fall-block hook contacts the lower surface of the rails E on a releasing and holding bracket E', that is connected to and supported above the desired portion of the track. This contact, in connection with the forward motion of the trolley, tips back the point of the fall-block hook, releasing the skip-carrier and allowing the trolley to carry same up the incline (see dotted lines in Fig. 6) until another or the same trolley descends to re-engage with it, when the force and weight of the trolley and skip carries the hook, &c., back into the position shown in full lines.

Describing the trolley in detail, (see Figs. 9, 10, and 11,) the car is made substantially in the form shown in such figures and provided with four flanged wheels $d$, adapted to run on the tracks of the inclined plane. The trolley is preferably made of cast-iron or similar material to give it sufficient weight, so that it may easily descend the inclined plane and engage the hoisting mechanism, as above described. The upper surface of the car is inclined toward the rear and the rear upper surface inclined so as to form a hooking recess $a^4$, in which the pin $c$ of the skip-carrier may be engaged. By bifurcating the rear end of the trolley car at $a^5$ the engagement and disengagement of the carrier-skip with the trolley is more easily effected and the weight of the skip more easily distributed on the trolley car. In Figs. 9 and 10 the eye portion $c'$ of the skip-carrier is shown in an enlarged view for the purpose of more clearly illustrating and describing the same.

Describing the means by which the skip is dumped at the desired place on the inclined plane, I place in any desired position between the tracks $A^2$ two side stop-blocks G G of any desired shape, and which at their front ends are preferably provided with a concaved recess $g$, adapted to receive and hold a ball, as hereinafter described. The skip is provided with three chains—two supporting-chains $g'$ and a tilting chain $g^2$. The supporting-chains are connected in a direct line to the skip-carrier and the tilting chain is connected to the tail end of the skip, passing over a chain-pulley $g^3$, and has its free end provided with a ball $g^4$. As the trolley and skip are drawn up the inclined plane, (see Figs. 2, 3, 4, and 5,) the ball will impact the concaved portion of the stop-blocks G and be held as the skip advances. This action raises the rear end of the skip into the position shown in Fig. 2, thereby discharging or dumping any material out of the skip which it may contain. When the skip has been dumped, the engineer releases the drum and the weight of the trolley, skip, &c., carries it down the inclined plane, thereby permitting the skip to return to its normal position, as shown in Fig. 3. The tilting mechanism may be located at any desired point of the inclined plane, and for that reason I prefer to removably secure the stops to the inside of the track by bolts, as shown in Figs. 4 and 5.

The advantages of my mechanism are that I have combined an inclined plane and cableway with mechanism by which one engineer or operator may entirely control the hoisting, conveying, and discharging of a skip and return the skip back into an excavation to be again reloaded.

While I have described my invention with more or less minuteness as regards details, I do not desire to be limited thereto unduly any more than is pointed out in the claims. On the contrary, I contemplate all proper changes in form, construction, and arrangement, the omission of parts and substitution of equivalents, as circumstances may suggest or necessity render expedient.

I claim—

1. A hoist and conveyer, comprising an inclined plane to which rails are attached, a trolley car movable thereon and adapted to carry a skip, carrier mechanism for pulling the trolley car to the upper portion of the inclined plane, a skip carrier adapted to be carried up and down the inclined plane by the trolley car, a skip adapted to be carried and moved by the skip carrier, hoisting mechanism to raise and lower the skip and carrier from an excavation or other point to the trolley, means for automatically releasing the skip and carrier from the hoisting mechanism and holding the fall block hook in position to re-engage same, and means for automatically dumping the skip at any desired point on the inclined plane, substantially as described.

2. A hoist and conveyer, comprising an inclined plane upon which tracks are laid, a trolley car movable thereon and adapted to carry a tilting skip, cable mechanism for pulling the trolley car to the upper portion of the inclined plane, a tilting skip adapted to be carried up and down the inclined plane by the trolley car, cable hoisting mechanism to raise and lower the skip from an excavation or other point to the trolley car and back to the excavation, means for automatically releasing the hoisting mechanism from the skip and hold it in position to be automatically re-engaged by the returning skip, and means for automatically tilting the skip at any desired point to dump any material therein on the inclined plane as the skip is pulled forward and permitted to return to its normal holding position in its retreating motion, substantially as described.

3. In combination with a hoist and conveyer having an inclined plane upon which tracks are attached, a trolley car adapted to move back and forth upon such tracks and provided with a bifurcated rear end and hooked upper recess to receive and hold bucket or skip-sustaining mechanism, substantially as described.

4. In combination with a hoist and conveyer having an inclined plane upon which tracks are attached, a trolley car carrying a skip and adapted to move back and forth upon such tracks, a skip adapted to carry desired material, hoisting mechanism provided with a hook to engage with the skip and raise and lower such skip, and a releasing and holding bracket located at a desired point on the inclined plane to contact the hook of the hoisting mechanism and hold it in position to be disengaged from the trolley during the continued forward motion of such trolley and continue holding it in such position until the returning trolley car has re-engaged it, substantially as described.

5. In combination with a hoist and excavator having an inclined plane upon which tracks are laid, a trolley car adapted to move back and forth upon such tracks, a tilting skip removably carried by the trolley car and provided with chain suspension mechanism, the rear chain being provided at its free end with an enlarged portion and adapted to tilt the skip, and means located in the path of the skip to contact and retain the projection of the rear chain and tilt the skip during its further forward motion and permit it to return to its normal position in its retreating motion, substantially as described.

RUGELEY D. SEYMOUR.

Witnesses:
THOMAS F. SHERIDAN,
THOMAS B. MCGREGOR.